Sept. 29, 1959     O. C. HOLDERER     2,906,032

CLINOMETER

Filed July 22, 1958     2 Sheets-Sheet 1

INVENTOR:
OSCAR C. HOLDERER
BY W. E. Thibodeau,
Victor L. Billings,
A. T. Dupont and
Alvin E. Moore,
ATTORNEYS.

Sept. 29, 1959     O. C. HOLDERER     2,906,032
CLINOMETER

Filed July 22, 1958     2 Sheets-Sheet 2

INVENTOR:
OSCAR C. HOLDERER
BY W. E. Thibodeau,
Victor L. Billings,
A. T. Dupont and
Alvin E. Moore,
ATTORNEYS.

2,906,032

CLINOMETER

Oscar C. Holderer, Huntsville, Ala.

Application July 22, 1958, Serial No. 750,275

11 Claims. (Cl. 33—214)

(Granted under Title 35, U.S. Code (1952), sec. 266)

The invention described herein may be manufactured and used by or for the Government for governmental purposes without the payment of royalty thereon.

This invention relates to a clinometer for measuring the angle of inclination of a datum line or surface relative to the horizontal plane established by the earth's gravitation field. The use of such a clinometer by technicians in the adjustment of tools or of elements being tested requires that the instrument be of light weight and small dimensions and yet have a high degree of accuracy and be capable of rapid, precision adjustment.

It is therefore an object of this invention to provide a clinometer that is compact, light in weight and capable of rapid use and precision adjustment.

It is a further object of the invention to provide a clinometer whose moving parts are in snug but low-friction engagement, without play or backlash, and may be easily adjusted for measurement of the angle of inclination of a datum line or surface.

The objects of the invention will become more fully apparent from the following detailed description of an exemplary embodiment thereof and from the accompanying drawings, in which:

Fig. 1 is an elevational view, partly in section, of one embodiment of the invention.

Figs. 2 and 3 are, respectively, sectional views along the lines 2—2 and 3—3 of Fig. 1.

Figure 1:
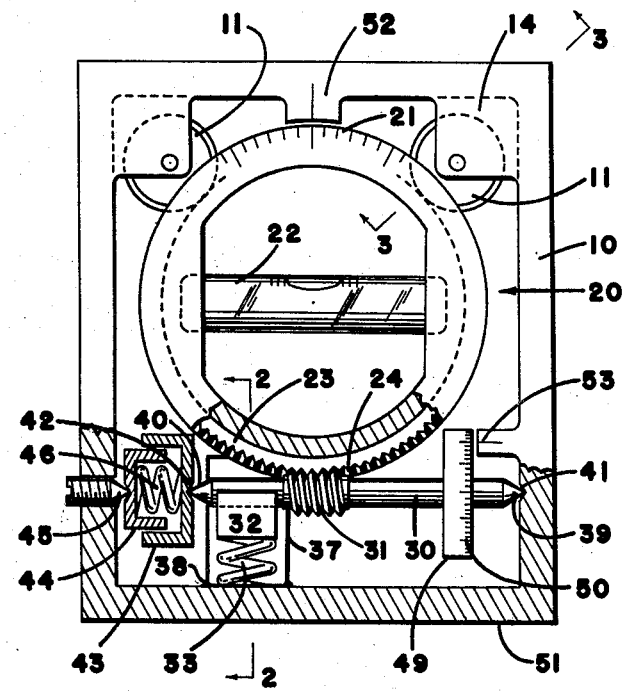
Figure 7:
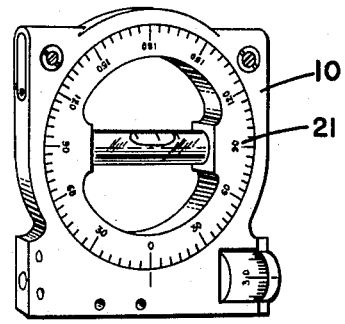
Fig. 7 is an elevational view of a clinometer comprising a modified form of housing.

As shown in the drawings, the clinometer comprises a frame or housing 10, shown as rectangular in Fig. 1 and as largely rectangular in Fig. 7, and a combined level-indicating and inclination-measuring device 20 that is rotatably mounted in housing 10 for precision adjustment. Element 20 has on its face a scale 21, visible through an opening in the housing, from which scale the angle of inclination of the measured datum line or surface may be ascertained, after the element 20 is rotated until the spirit level 22 indicates a horizontal position.

Element 20 is rotatably supported in housing 10 by means of two rollers 11 that bear against the upper part of groove 23 and by means of spring-pressed worm shaft 30. Rollers 11 are shown as having rims that are triangular in cross section, but they may be crowned, or have any other configuration that allows their easy rotation on the base of groove 23.

Figure 3:
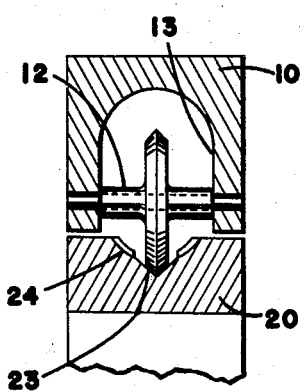
Figure 4:
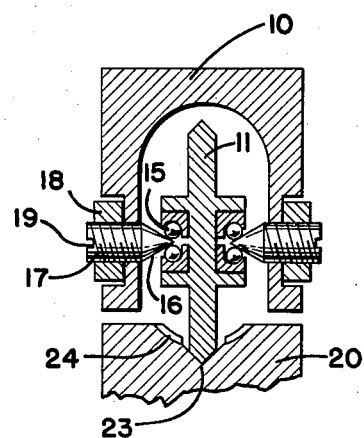
Fig. 4 is a sectional detail view similar to Fig. 3 but showing a modification of the bearings for rollers 11.

In Figs. 3 and 4 alternative types of bearings for the rollers are shown. In Fig. 3 the roller disk is shown as having side extensions 12 which have a radial bearing on a fixed shaft and thrust bearings against surfaces 13 on frame 10. As shown in Fig. 1, these thrust surfaces are on small plates 14 that are integral with or fixed to frame 10. As shown in Fig. 7, said surfaces are on a pair of opposite walls of frame or housing 10, each of said walls having at its center a circular aperture that clears and makes visible scale 21. In Fig. 4 wear-compensating, combined radial and thrust bearings are shown. Hollow cylindrical side extensions of roller 11, which may be integral with the central disk of the roller (with said extensions being formed by boring), or may be separately fixed to the central disk, support antifriction bearing races that are pressed into the cup-like spaces that are formed by said extensions. Said races support balls 15 which have radial and thrust bearing on the conical ends 16 of bearing elements 17 that may be screwed into or out of threaded elements 18 that are fixed to housing 10, by means of kerf 19 and a screwdriver. Thus initial adjustments or rollers 11 and dial element 20 may be achieved and later compensation for wear on the bearings may be made.

Wheel or dial element 20 supports worm wheels 24, which are integral with or fixed to extensions of the surfaces of groove 23. Worm 31, which is integrally or otherwise fixed to spring-pressed spindle 30, is forced into continual, close engagement with the laterally spaced worm wheels 24 by radial bearing pad 32, pressed against spindle 30 by a spring. In the embodiment of Fig. 1 this spring is shown as a coil spring 33, and in the embodiment of Fig. 6 as a set of Belleville or spring washers 34. With either the coil spring or the spring washers, a means for adjusting the spring tension of the type shown in Fig. 6 may be used. This means comprises a plate 60, which may be detached from housing 10 by unscrewing setscrews 61, thus uncovering an opening through which the spring means and its base plate 62 may be inserted or replaced. When setscrew 63 is turned it adjusts the tension of the spring.

Figure 2:
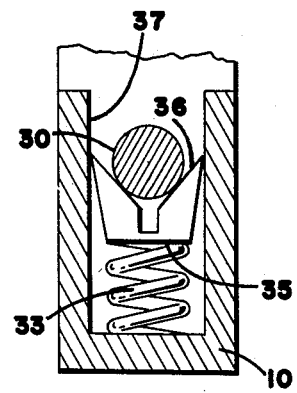
Figure 6:
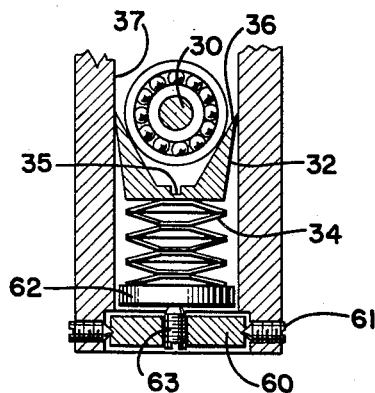
Fig. 6 is a detail sectional view showing a modification of the spring-supported radial bearing for shaft 30.

Bearing pad 32, which may be of cylindrical or polygonal outer shape, has a V-shaped cutout portion with a recess at its base providing a thin wall portion 35 which is sufficiently elastic to permit the sides 36 of the pad to spread and stay in close contact with spaced guide walls 37 which, in the case of planar guide walls 37 such as are shown in Fig. 1, may be welded, as at 38, or otherwise secured to housing 10. If element 37 is cylindrical it may be formed integrally with housing 10, as by boring. This spreading of sides 36 also causes the inner surfaces of said sides to snugly engage, as shown in Fig. 2, with spindle 30, or alternatively, as shown in Fig. 6, the outer race of a set of radial antifriction bearings.

As shown in Fig. 1, the pointed ends 39 and 40 of spindle 30 are supported in two pivot bearings 41 and 42. Bearing 41 is fixed to or integral with main housing 10; and bearing 42 is recessed in support element 43, which is self-aligning relative to housing 10. Element 43 is loosely mounted on another bearing element, 44, which has a recessed pivot bearing on the conical end 45 of a pin that may be screwed into or out of housing 10 by means of a screwdriver. This screwthreaded feature permits adjustment of spring 46, which forces bearing elements 43 and 44 apart thereby maintaining the points of conical bearing elements 39 and 40 in correct, low-friction, but snug-fitted engagement with their complementary recessed bearing elements. The spring 46 and its housing elements thus constitute an automatic means for taking up wear in the said bearing elements and at the same time allow flexibility of the spring end of spindle 30 as it urges worm 31 against gears 24.

Figure 5:
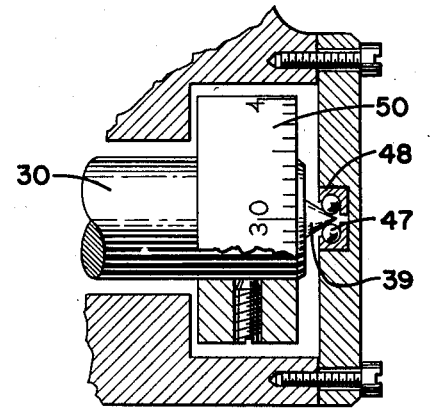
Fig. 5 is a sectional detail view showing a modification of the thrust bearing that is shown in Fig. 1 as journaling the right-hand end of shaft 30.

An alternative type of bearing that may be utilized for journaling any or all of the conical pivot elements 39, 40 and 45 is shown in Fig. 5 as comprising combined radial and thrust ball bearings 47 which rotate on the conical journal and within bearing race 48.

Scale 21 on dial element 20 is preferably graduated in degrees of arc, with 360 lines on its circular extent. The gear ratio between the threads of worm 31 and the teeth of worm wheels 24 is preferably such that when knob 49 and spindle 30 are turned one complete revolution dial element 20 is turned one degree. In this case, the vernier scale 50 preferably has 60 equally spaced lines, so that each line represents one minute of arc relative to scale 21.

The clinometer is initially adjusted so that the spirit level 22 indicates the horizontal position when base surface 51 of housing 10 is level and the zero marks of scales 21 and 50 are, respectively, opposite marks 52 and 53.

In use of the clinometer, base surface 51 is placed on the object that has a line or surface or pair of points or surfaces whose inclination is to be measured, and knob 49 is turned until spirit level 22 indicates the horizontal position. Scale 21 then indicates the degrees of inclination and scale 50 the minutes.

Within the scope of the appended claims, the invention comprehends various obvious changes in the specific structure herein illustrated. For instance, it is obvious that separate radial and thrust sets of ball or roller bearings may be substituted for the pivot bearings that are shown in Fig. 1 or Fig. 5 as journaling the ends of spindle 30.

The following invention is claimed:

1. A clinometer comprising: a frame having a datum line adapted for contact with objects for measuring inclinations; an assembly movable in said frame comprising a rotatable level indicator, a rotatable member having an annular groove on its periphery and having an inclination-indicating scale, and an actuator means for simultaneously rotating said indicator and scale; and means for supporting said assembly for movement in said frame and for maintaining relatively movable parts of said assembly in snug, wear-compensating engagement, comprising bearing means on one part of said frame for journaling said rotatable member and means on another part of said frame for floatingly supporting said assembly on said frame comprising bearing means for said actuator means and resilient means between said frame and last-named bearing means, said bearing means for journaling said rotary member comprising a rotor having a rim of a shape adapted to coact with said groove in centering the rim in said groove.

2. A clinometer comprising: a frame having a datum line adapted for contact with objects for measuring inclinations; an assembly movable in said frame comprising a rotatable level indicator, a rotatable member having an inclination-indicating scale, and actuator mens comprising a rotatable shaft for simultaneously rotating said indicator and scale; and means for supporting said assembly for movement in said frame and for maintaining relatively movable parts of said assembly in snug, wear-compensating engagement, comprising bearing means on one part of said frame for journaling said rotatable member and means on another part of said frame for floatingly supporting said assembly on said frame comprising a radial bearing for said actuator means, and resilient means between said frame and radial bearing for urging said radial bearing into bearing contact with said shaft.

3. A device as set forth in claim 1, in which said bearing means for journaling said rotary member further comprises antifriction bearing means for journaling said rotor on said frame, and in which said antifriction bearing means comprises means for adjusting the bearing for compensating for its wear.

4. A device as set forth in claim 2, in which said frame comprises walls that contain said radial bearing and resilient means, said radial bearing comprising a pad with side portions that contact said shaft and a middle portion that is thinner than the side portions and is clear of said shaft.

5. A device as set forth in claim 4, in which said resilient means urges said side portions into contact with said shaft and also into contact with said walls.

6. A device as set forth in claim 2, in which said means for supporting said assembly further comprises a pair of thrust bearings for the ends of said shaft.

7. A device as set forth in claim 6, in which said thrust bearings comprise conical end journals on said shaft, that are journaled in recessed elements on said frame.

8. A device as set forth in claim 7, in which one of said pair of thrust bearings comprises resilient means supported by the frame for automatically compensating for thrust bearing wear.

9. A device as set forth in claim 7, which comprises means on said frame for manually adjusting the force of said resilient means.

10. A clinometer comprising: a frame having an opening; a dial member having a scale, mounted on said frame so that inclination-indicating graduations on said scale are visible through said opening; a level indicator supported by said dial member; gear means on the periphery of said dial member; roller means for journaling said dial member relative to said frame on one side of the center of the dial member; a gear in engagement with said first-named gear means on the other side of said center, said dial member being supported by said roller, gear means and gear; means for maintaining said gear means and gear in snug contact comprising bearing means for said gear and resilient means on said frame for maintaining said bearing means in close contact with said shaft; means for rotating said gear, said gear means comprising a worm wheel, and said gear being a worm; a shaft mounted on said frame on which said worm is fixed; said bearing means comprising thrust bearings for the ends of said shaft, resilient support means for one of said thrust bearings, a plain bearing on said shaft on one side of said worm, and spring means for supporting said plain bearing on said frame.

11. A device as set forth in claim 10, in which said means for rotating the worm comprises a knob, said knob having a scale that indicates the measured inclination in fractions of degrees, while said first-named scale indicates said inclination in degrees.

References Cited in the file of this patent

UNITED STATES PATENTS

| 1,027,532 | Finn | May 28, 1912 |
| 1,822,740 | Loeser et al. | Sept. 8, 1931 |